(12) United States Patent
Cho et al.

(10) Patent No.: US 12,456,784 B2
(45) Date of Patent: Oct. 28, 2025

(54) BATTERY PACK

(71) Applicant: SK On Co., Ltd., Seoul (KR)

(72) Inventors: Sei Hoon Cho, Daejeon (KR); Bon Seok Ku, Daejeon (KR); Jun Hee Jung, Daejeon (KR); Jae Il Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 754 days.

(21) Appl. No.: 17/572,947

(22) Filed: Jan. 11, 2022

(65) Prior Publication Data

US 2022/0223988 A1 Jul. 14, 2022

(30) Foreign Application Priority Data

Jan. 12, 2021 (KR) .................. 10-2021-0003987

(51) Int. Cl.
*H01M 50/581* (2021.01)
*H01M 10/42* (2006.01)
(Continued)

(52) U.S. Cl.
CPC ....... *H01M 50/581* (2021.01); *H01M 10/425* (2013.01); *H01M 10/482* (2013.01);
(Continued)

(58) Field of Classification Search
CPC ............ H01M 50/581; H01M 10/425; H01M 10/482; H01M 10/486; H01M 2010/4271;
(Continued)

(56) References Cited

U.S. PATENT DOCUMENTS 11,600,893 B2 * 3/2023 Park .................. B60L 3/0046
2011/0039147 A1 2/2011 Cheon et al.
(Continued)

FOREIGN PATENT DOCUMENTS

EP 1580865 A1 * 9/2005 ............ H02J 7/0031
FR 3011392 A1 * 4/2015 ............ B60L 11/1851
(Continued)

OTHER PUBLICATIONS

KR 20170069613 A English machine translation of Description (Year: 2024).*
(Continued)

*Primary Examiner* — Matthew T Martin
*Assistant Examiner* — Felicity B Alban
(74) *Attorney, Agent, or Firm* — The Webb Law Firm (57) ABSTRACT

Provided is a battery pack, including a battery module array including a plurality of battery modules coupled in series and having first and second terminals, each of the plurality of battery modules including at least one battery cell, a current blocking element coupled to the battery cell and opened when an overcurrent is applied, and a sensor unit measuring state information of the battery cell and transmitting the measured information; a battery blocking unit including a first switch unit coupled to the first terminal in series, a second switch unit coupled to the second terminal in series, and a third switch unit coupled to the first and second terminals; and a battery management system turning on the third switch unit to open the current blocking element when the measured information exceeds a predetermined threshold value.

10 Claims, 5 Drawing Sheets

(51) Int. Cl.
  *H01M 10/48* (2006.01)
  *H02J 7/00* (2006.01)
(52) U.S. Cl.
  CPC ....... *H01M 10/486* (2013.01); *H02J 7/00032* (2020.01); *H02J 7/00714* (2020.01); *H02J 7/007194* (2020.01); *H01M 2010/4271* (2013.01)
(58) Field of Classification Search
  CPC ............. H01M 50/574; H01M 10/052; H01M 50/583; H01M 10/4257; H01M 10/48; H01M 2200/103; H02J 7/00032; H02J 7/00714; H02J 7/007194; H02J 7/0013; H02J 7/00309; H02J 7/0047; H02J 7/00304; H02J 7/0031
  See application file for complete search history.

(56) References Cited

U.S. PATENT DOCUMENTS

| | | | | |
|---|---|---|---|---|
| 2012/0194004 | A1 | 8/2012 | Lim | |
| 2013/0313896 | A1* | 11/2013 | Gless | B60L 3/00 307/112 |
| 2013/0323577 | A1* | 12/2013 | Yang | H01M 4/70 429/211 |
| 2014/0340046 | A1* | 11/2014 | Komori | H01H 85/0241 320/134 |
| 2015/0037616 | A1* | 2/2015 | Wyatt | H01M 10/613 429/153 |
| 2015/0111072 | A1 | 4/2015 | Han et al. | |
| 2017/0062795 | A1 | 3/2017 | Byun et al. | |
| 2018/0175457 | A1* | 6/2018 | Choi | H02H 7/18 |
| 2019/0077275 | A1* | 3/2019 | Capati | H01M 10/63 |
| 2021/0165054 | A1* | 6/2021 | Klee | G01R 31/374 |
| 2022/0376520 | A1* | 11/2022 | Lee | H02J 7/00304 |
| 2023/0291021 | A1* | 9/2023 | Yoo | H01M 10/48 |

FOREIGN PATENT DOCUMENTS

| | | | | |
|---|---|---|---|---|
| JP | 2002095157 A | * | 3/2002 | |
| JP | 2015165735 A | | 9/2015 | |
| KR | 1020110017778 A | | 2/2011 | |
| KR | 1020120088271 A | | 8/2012 | |
| KR | 1020150045737 A | | 4/2015 | |
| KR | 1020170024842 A | | 3/2017 | |
| KR | 20170069613 A | * | 6/2017 | .......... B60L 11/1851 |

OTHER PUBLICATIONS

FR 3011392 A1 English machine translation of Description (Year: 2024).*
English machine translation of Aoki JP2002095157A.*
English abstract of EP 1580865 A1.*

* cited by examiner

BATTERY PACK

CROSS-REFERENCE TO RELATED APPLICATION

This application claims priority to Korean Patent Application No. 10-2021-0003987 filed Jan. 12, 2021, the disclosure of which is hereby incorporated by reference in its entirety.

BACKGROUND OF THE INVENTION

1. Field of the Invention

The present disclosure relates to a battery pack.

2. Description of Related Art

A secondary battery is a battery that can be repeatedly used because it can be charged and discharged. The secondary battery may consist of a single battery cell and may be used in small portable electronic devices such as mobile phones, notebook computers, computers, cameras, camcorders, or may consist of a battery pack including a plurality of battery cells and may be used as a power source for driving motors such as high-output hybrid electric vehicles (HEV), electric vehicles (EV), and the like.

A battery used in a hybrid electric vehicle (HEV) or an electric vehicle (EV) must realize high output and high capacity. For this reason, a plurality of batteries constitute a battery pack as a single unit, and a plurality of such battery packs may be electrically connected in series or parallel to be used as a high-capacity and high-output power source.

As described above, as the battery pack is used as a high-capacity high-output power source, the battery pack is being improved to have higher energy density. However, as the battery pack has higher energy density, when some battery modules of the battery pack are damaged, a temperature of the undamaged battery modules also rapidly rises and thermal propagation may occur. Such thermal propagation of the battery pack poses a great risk to user safety.

SUMMARY OF THE INVENTION

An aspect of the present disclosure is to provide a battery pack in which thermal propagation is prevented.

According to an aspect of the present disclosure, a battery pack includes: a battery module array including a plurality of battery modules coupled in series and having first and second terminals, each of the plurality of battery modules including at least one battery cell, a current blocking element coupled to the battery cell and opened when an overcurrent is applied, and a sensor unit measuring state information of the battery cell and transmitting the measured information; a battery blocking unit including a first switch unit coupled to the first terminal in series, a second switch unit coupled to the second terminal in series, and a third switch unit coupled to the first and second terminals; and a battery management system turning on the third switch unit to open the current blocking element when the measured information exceeds a predetermined threshold value.

BRIEF DESCRIPTION OR DRAWINGS

The above and other aspects, features and other advantages of the present disclosure will be more clearly understood from the following detailed description taken in conjunction with the accompanying drawings, in which.

DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for the purposes of clarity, illustration, and convenience.

Hereinafter, exemplary embodiments of the present disclosure will be described with reference to various examples. However, embodiments of the present disclosure may be modified to have various other forms, and the scope of the present disclosure is not limited to the embodiments described below.

Figure 1:
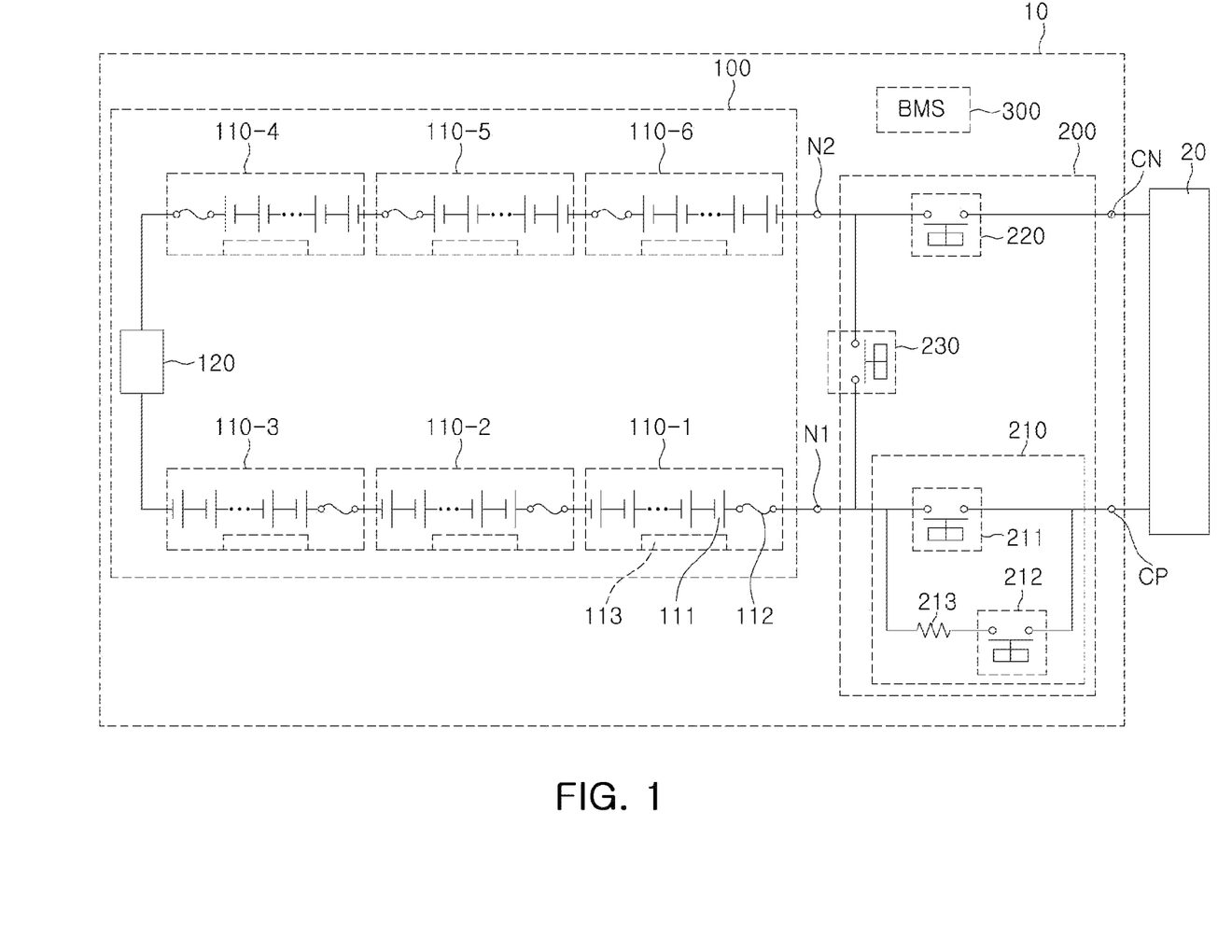
FIG. 1 is a schematic block diagram of a battery pack according to an embodiment of the present disclosure.
Figure 2:
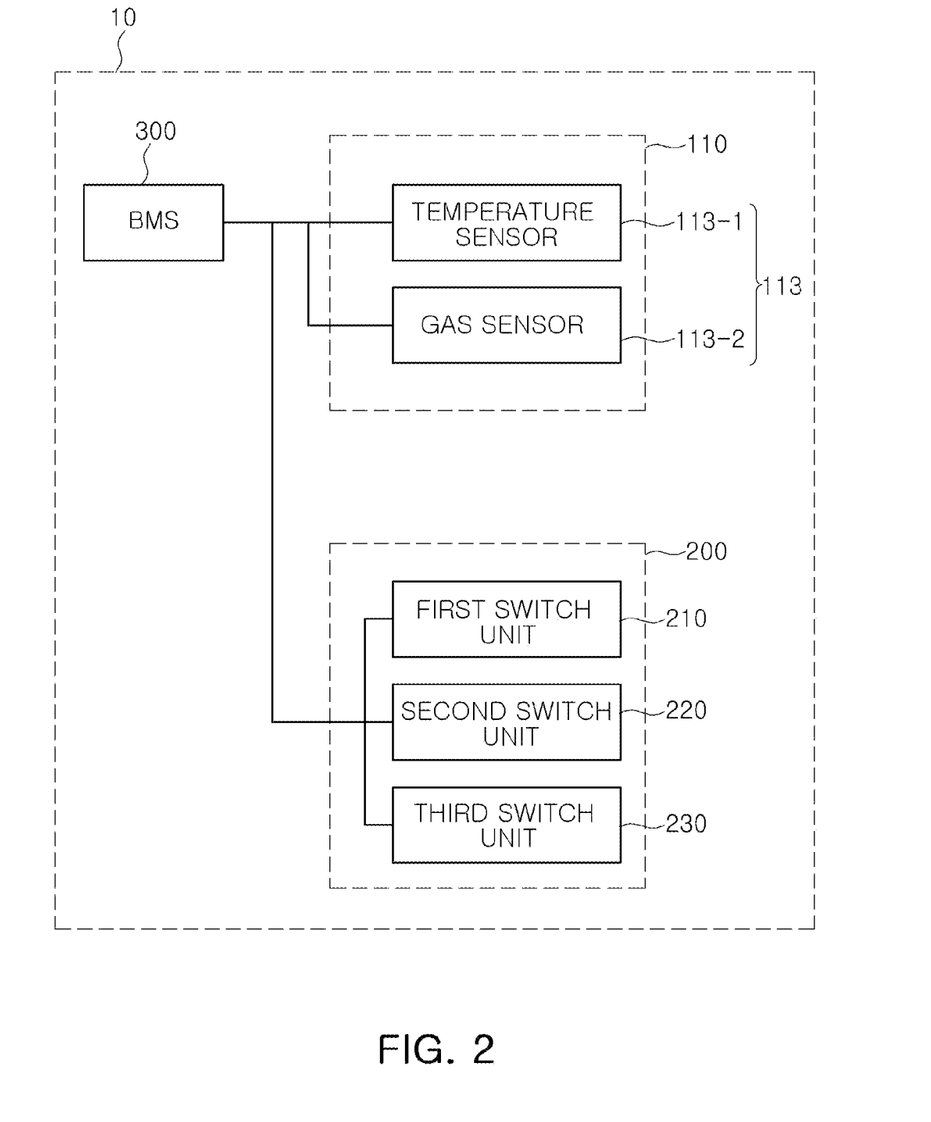
FIG. 2 is a block diagram illustrating control of a battery management system.

Referring to FIGS. 1 and 2, a battery pack according to an embodiment will be described. FIG. 1 is a schematic block diagram of a battery pack according to an embodiment of the present disclosure, and FIG. 2 is a block diagram illustrating control of a battery management system.

Referring to FIG. 1, a battery pack 10 according to an embodiment of the present disclosure may include a battery module array 100 having first and second terminals N1 and N2, a battery blocking unit 200 connected to the first and second terminals N1 and N2 of the battery module array 100, and a battery management system (BMS) 300. The battery pack 10 may include first and second output terminals CP and CN for supplying a current to an external device 20.

The battery module array 100 may include a plurality of battery modules 110 connected in series. Each of the plurality of battery modules 110 may include one or more battery cells 111, and may include a current blocking element 112 connected to the battery cell 111 in series, and a sensor unit 113. When a plurality of battery cells 111 are employed in the battery module 110, the plurality of battery cells 111 may be connected to each other in series, parallel, and series-parallel. The battery module array 100 according to an embodiment may have a structure in which first to sixth battery modules 110-1 to 110-6 are connected in series.

According to an embodiment, a manual service disconnector module 120 may be connected to the battery module 110 in series.

As the battery cell 111, various types of secondary batteries that can be repeatedly charged and discharged may be employed. In one embodiment, the battery cell 111 may be a lithium ion battery.

The current blocking element 112 is an element opened when an overcurrent flows through the battery module 110 to protect the battery module 110, and in an embodiment, the current blocking element 112 may be a fuse, but is not limited thereto. The current blocking element 112 may be opened when an overcurrent flows through the battery module 110 to electrically separate the plurality of battery modules 110 connected in series, respectively.

The sensor unit 113 may measure state information of the battery module 110 and transmit a measured information to the battery management system 300. The sensor unit 113 may include various sensors for measuring state information of the battery module 110. The sensor unit 113 may include at least one of a temperature sensor 113-1 and a gas sensor 113-2, and may include a voltmeter according to an embodiment. In addition, the sensor unit 113 may include a plurality of sensors. For example, the sensor unit 113 may include a temperature sensor 113-1 and a gas sensor 113-2, the temperature sensor 113-1 may measure a temperature of the battery module 110, and transmit a measured information thereof to the battery measurement system 300, and the gas sensor 113-2 may measure gas concentration in the battery module 110 and transmit a measured information thereof to the battery management system 300.

Referring to FIGS. 1 and 2, the battery management system 300 may receive a measured information transmitted from the sensor unit 113 disposed in each of the battery modules 110, compare the measured information with a predetermined threshold value, to determine whether the battery module 110 normally operates. The battery management system 300 may determine that the measured information detected by the sensor unit 113 is lower than or equal to the predetermined threshold value as a "normal state" in which the battery module 110 normally operates, and determine that the measured information detected by the sensor unit 113 exceeds the predetermined threshold value as an "abnormal state" in which the battery module 110 does not operate normally. Such an abnormal state of the battery module 110 may occur when the battery cell 111 is damaged by an external factor such as an impact. In the battery module 110 exceeding a threshold value, ignition may start, heat generated in the ignited battery module 110 is transferred to a neighboring battery module 110, and an entire battery module array 100 is ignited and combustible gas is ejected. In this case, when the battery module array 100 is in a high-voltage energy state, a so-called 'massive explosion' in which the entire battery module array 100 explodes beyond simple ignition may occur. Such a large-scale explosion is more severe when the battery module array 100 is in a high voltage state. In this way, the battery pack 10 in an embodiment electrically separates the plurality of battery modules 110 of the battery module array 100 from each other before the battery module array 100 explodes on a large scale, and changes to a low voltage state, such that the large-scale explosion may be reduced to a small-scale explosion, or it may be stopped with simple ignition. This will be described later in detail.

The predetermined threshold value at which the battery management system 300 determines an abnormal state is a pre-stored value, and various values capable of comparing the measured information transmitted from the sensor unit 113 may be pre-stored. For example, when a temperature is measured by the sensor unit 113, the predetermined threshold value may be a temperature value. In addition, when gas concentration is measured by the sensor unit 113, the predetermined threshold value may be a gas concentration value. Also, when the voltage is measured, the predetermined threshold value may be a voltage value. Specifically, for example, when the temperature is measured by the sensor unit 113, and the battery cells included in the battery module 110 are lithium-ion battery cells, the predetermined threshold value may be 50° C. In addition, when a voltage is measured by the sensor unit 113, the predetermined threshold value may be based on a value at which a discharge rate of 50 Crate or more lasts for several seconds.

In addition, even when the measured information transmitted from the sensor unit 113 of any one of the battery modules 110 among the plurality of battery modules 110 is higher than the measured information transmitted from the sensor unit 113 of the other battery modules 110 by exceeding 3° C., the battery management system 300 may determine that the corresponding battery module 110 as an abnormal state.

In addition, when the sensor unit 113 includes both a temperature sensor 113-1 and a gas sensor 113-2, the battery management system 300 may be determined as an abnormal state only when both the measured information measured by the temperature sensor 113-1 and the measured information measured by the gas sensor 113-2 exceed predetermined threshold values.

When the battery module 110 is determined to be in a normal state, the battery management system 300 may turn on first and second switch units 210 and 220, such that a current of the battery module array 100 may be supplied to an external device 20. In addition, when the battery module 110 is determined to be in an abnormal state, a third switch unit 230 may be turned on to short-circuit the battery module array 100, and by allowing an overcurrent to flow in the short-circuited battery module array 100, the battery management system 300 may open the current blocking element 112 included in each battery module 110, and thereby, each battery module 110 may be electrically separated and a problem of thermal propagation may be prevented in advance.

Referring to FIG. 1, a battery blocking unit 200 may be disposed between the battery module array 100 and an external device 20, and may block a current transmitted from the battery pack 10 to the external device 20 under control of the battery management system 300. That is, an input unit of the battery blocking unit 200 may be connected to first and second terminals N1 and N2 of the battery module array 100, and an output unit thereof may be connected to first and second output terminals CP and CN of the battery pack 10.

The battery blocking unit 200 may include a first switch unit 210 connected to the first terminal N1 in series, a second switch unit 220 connected to the second terminal N2 in series, and a third switch unit 230 connecting the first and second terminals N1 and N2 to each other. The first to third switch units 210 to 230 may be formed of various types of switch elements. At least one of the first to third switch units 210 to 230 may include a plurality of switch elements, and a resistance element may be further disposed in any one of the switch units. In an embodiment, the first switch unit 210 may further include a resistance element 213 in which the first and second switch elements 211 and 212 are connected in parallel to each other, and having the second switch element 212 connected in series.

In an embodiment, the first to third switch units 210 to 230 may be configured as power relays. The first to third switch units 210 to 230 may be turned on or off according to the control of the battery management system 300, to block a current flowing through the first to third switch units 210 to 230. When the battery module array 100 is in a normal state, the first and second switch units 210 and 220 may be turned on and the third switch unit 230 may be turned off, so that the current supplied from the battery module array 100 may be supplied to the external device 20. In addition, when the battery module array 100 is in an abnormal state, the third switch unit 230 may be turned on to short-circuit the first and second terminals N1 and N2 of the battery module array 100 to each other. When the first and second terminals N1 and N2 are short-circuited by each other, an overcurrent may be generated in the battery module array 100, and a current blocking element 112 included in each battery module 110 included in the battery module array 100 may be opened. Accordingly, each of the battery modules 110 included in the battery module array 100 may be electrically separated from each other. This has an effect of separating one high-capacity and high-output battery module array 100 into a plurality of low-capacity and low-output battery modules 110. Accordingly, it is possible to prevent thermal propagation from occurring in the battery pack 10 in a high-capacity and high-output state.

This will be described in detail with reference to FIGS. 3 to 5.

Figure 3:
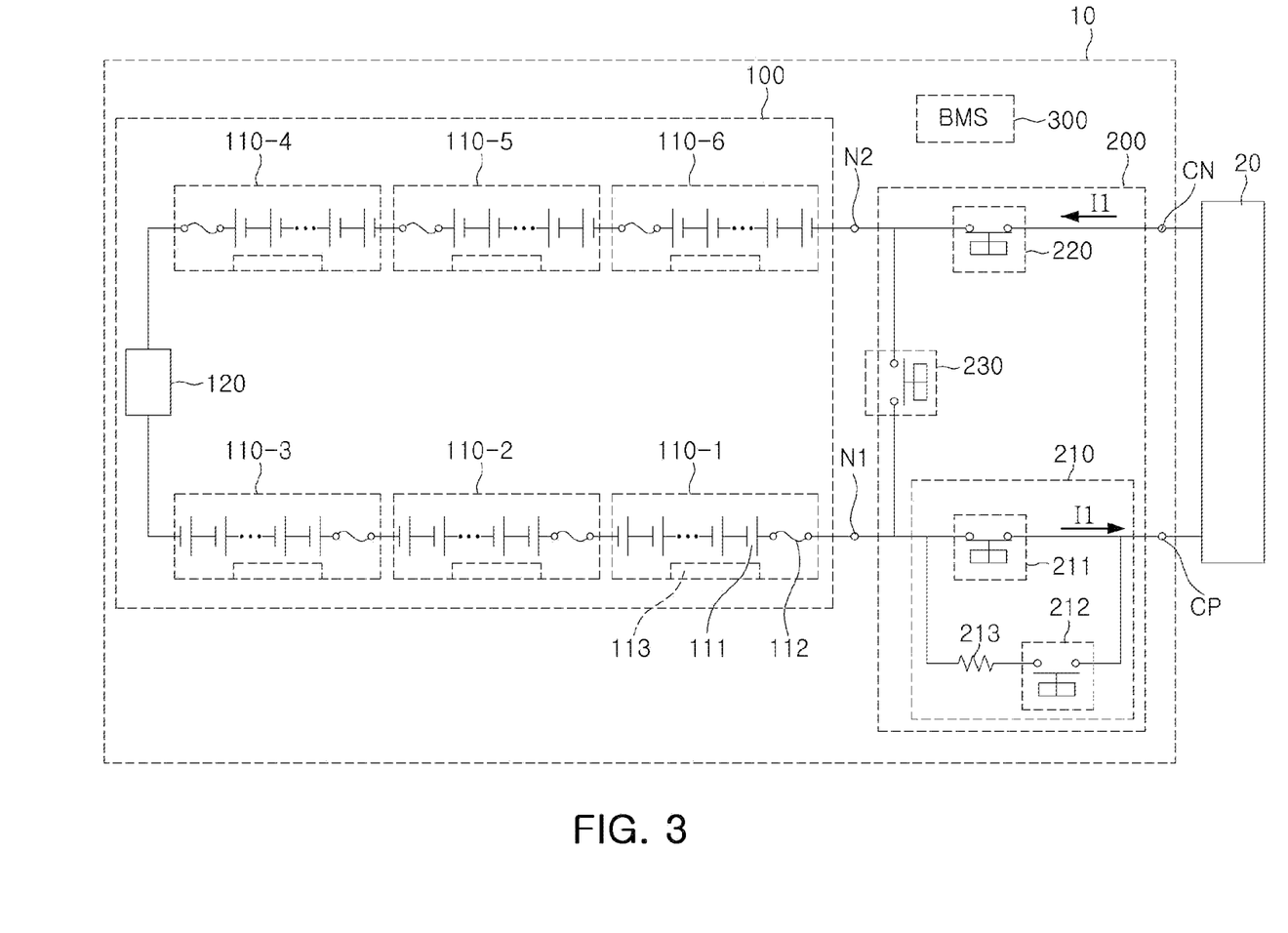
FIGS. 3 to 5 are diagrams illustrating an explosion prevention function of the battery pack of FIG. 1.

FIG. 3 illustrates a case in which the battery module 110 of the battery pack 10 is in a normal state, and in FIG. 3, first and second switch units 210 and 220 of the battery blocking unit 200 may be turned on, respectively, and a third switch unit may be turned off, so that a current I1 supplied from the battery module array 100 may be supplied to an external device 20.

Figure 4:
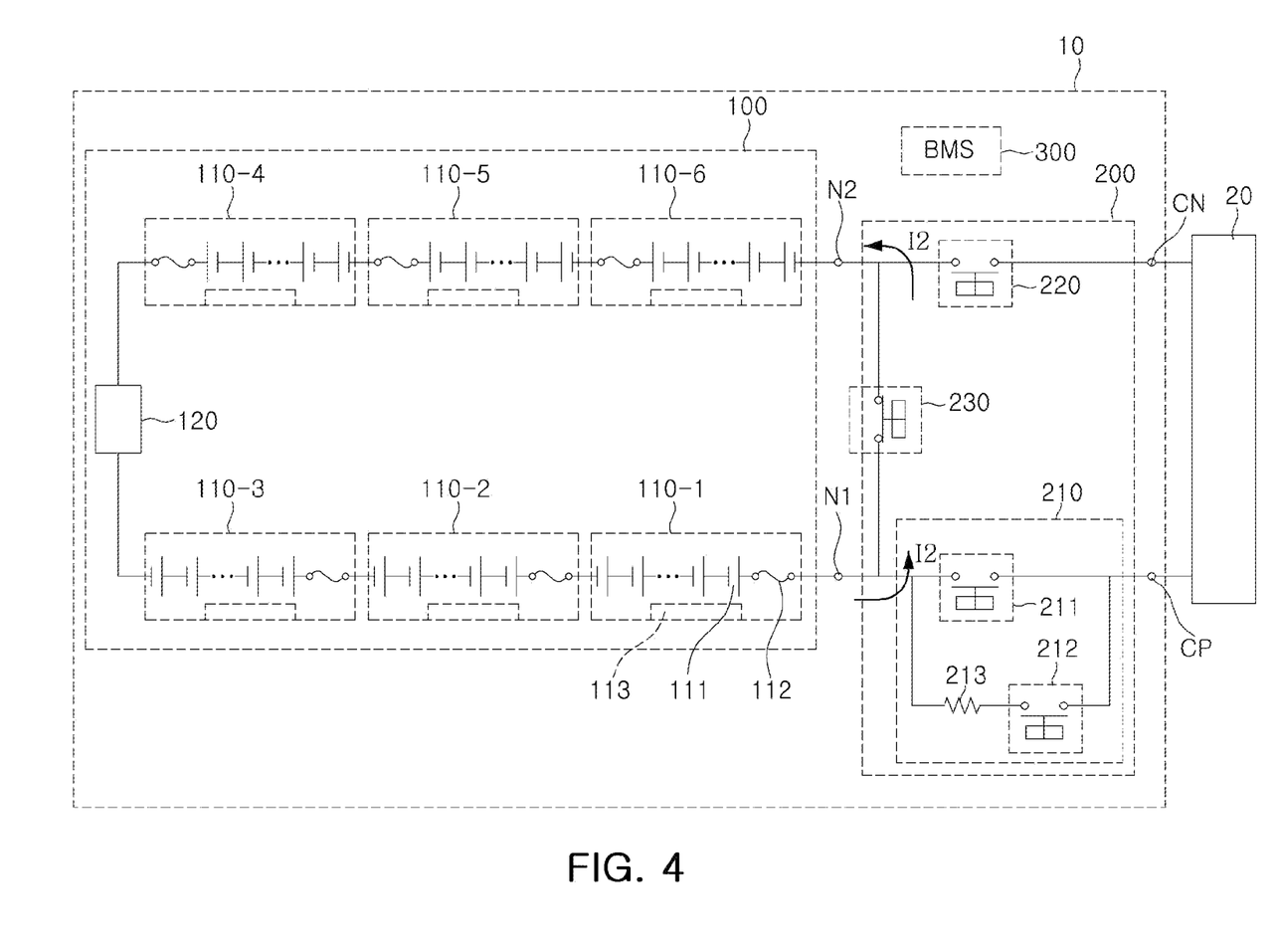

FIG. 4 illustrates a case in which any one of the battery modules 110 of the battery pack 10 is in an abnormal state. In an embodiment, it is assumed that a first battery module 110-1 is damaged and is in an abnormal state. Since the first battery module 110-1 in an abnormal state ignites and an internal temperature rises rapidly, a high temperature, higher than a predetermined threshold value, may be measured or high concentration of gas may be detected in the sensor unit 113. Since the measured information transmitted from the sensor unit 113 exceeds a predetermined threshold value, an ON signal may be applied to the third switch unit 230 of the battery blocking unit 200 such that first and second terminals N1 and N2 of the battery module array 100 may be short-circuited. According to an embodiment, the third switch unit 230 may be turned on and the first and second switch units 210 and 220 may be turned off. When the first and second terminals N1 and N2 are short-circuited, a closed-loop is formed, and an overcurrent I2 flows through the battery module array 100.

Figure 5:
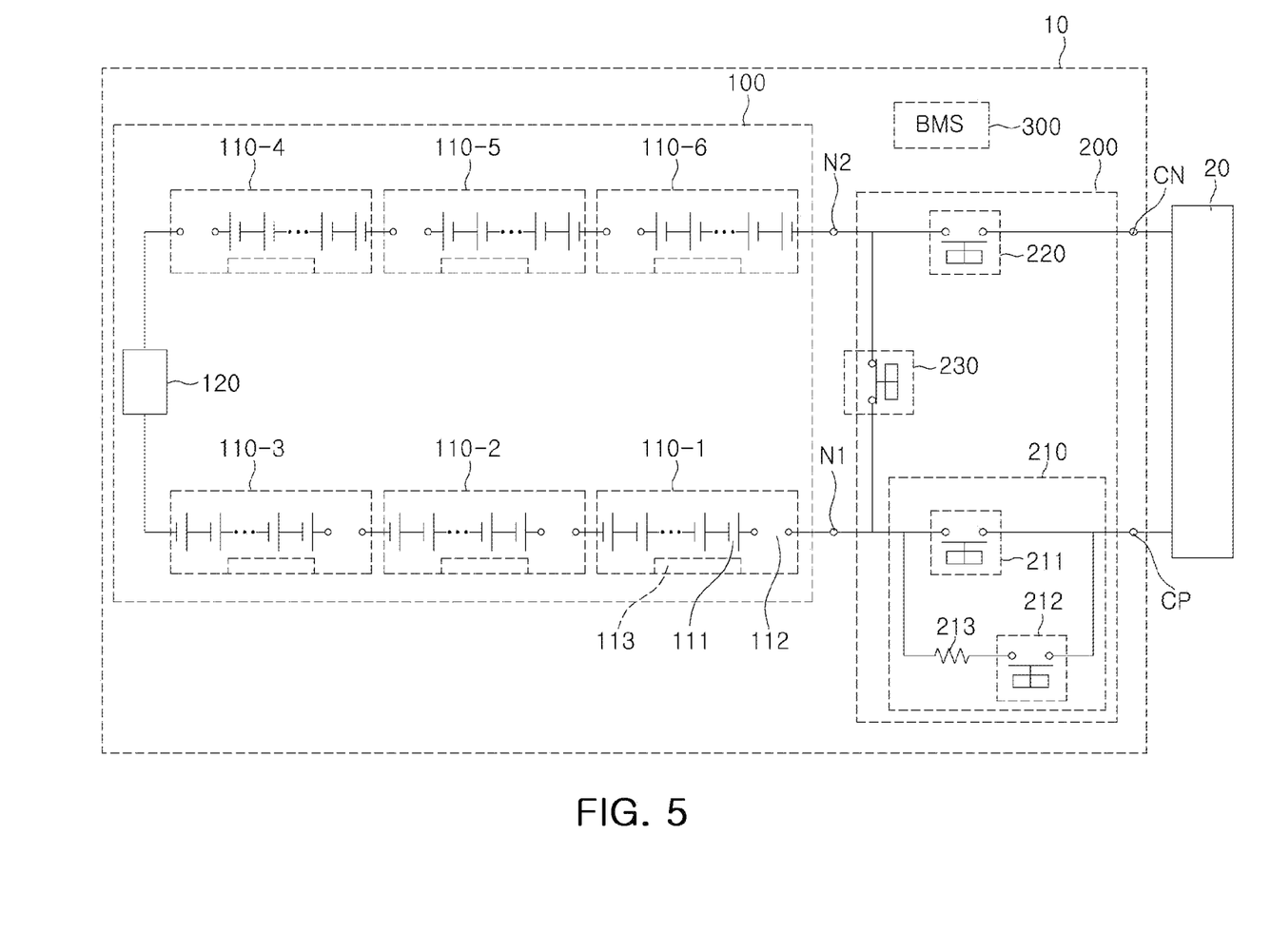

Accordingly, as shown in FIG. 5, a current blocking element 112 included in each of the battery modules 110 is melted and opened by a high current, so that each battery module 110 is electrically separated from others thereof. As described above, before the battery module array 100 explodes on a large scale, when the plurality of battery modules 110 of the battery module array 100 are electrically separated from each other, the battery module array 100 is changed to a low-voltage state, and explosion may be reduced compared to a high-voltage state.

As set forth above, in a battery pack according to the technical idea of the present disclosure, when a problem occurs in some battery modules and there is a possibility to escalate into thermal propagation, by electrically separating the battery modules constituting the battery pack from each other, a problem occurring in some battery modules can affect neighboring battery modules and prevent the problem from escalating into thermal propagation.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

While example embodiments have been shown and described above, it will be apparent to those skilled in the art that modifications and variations could be made without departing from the scope of the present inventive concept as defined by the appended claims.

What is claimed is:

1. A battery pack, comprising:
a battery module array comprising a plurality of battery modules coupled in series and having first and second terminals, each of the plurality of battery modules comprising at least one battery cell, a current blocking element coupled to the battery cell and opened when an overcurrent is applied, and a sensor unit measuring state information of the battery cell and transmitting the measured information to a battery management system;
a battery blocking unit comprising a first switch unit coupled to the first terminal in series, a second switch unit coupled to the second terminal in series, and a third switch unit coupled to the first and second terminals in parallel with the plurality of battery modules; and
the battery management system turning on the third switch unit when the measured information exceeds a predetermined threshold value,
wherein the third switch unit turned on by the battery management system opens the current blocking element when the measured information exceeds the predetermined threshold value.

2. The battery pack of claim 1, wherein the sensor unit comprises at least one of a temperature sensor and a gas sensor.

3. The battery pack of claim 1, wherein the sensor unit comprises a plurality of temperature sensors respectively disposed in the plurality of battery modules, and the measured information is a temperature information value of the battery cell,
wherein the battery management system turns on the third switch unit when a measured information received from at least one temperature sensor is higher than a sum of the predetermined threshold value and a measured information received from the other temperature sensor, and
wherein the predetermined threshold value is 3° C.

4. The battery pack of claim 1, wherein the sensor unit comprises a temperature sensor and a gas sensor, and
wherein the battery management system turns on the third switch unit when measured information received from the temperature sensor and the gas sensor exceeds the predetermined threshold value.

5. The battery pack of claim 1, wherein the battery cell is a lithium ion battery cell,
wherein the sensor unit comprises a temperature sensor transmitting the measured information to the battery management system, and
wherein the predetermined threshold value is 50° C.

6. The battery pack of claim 1, wherein the battery management system turns off the first switch unit and the second switch unit when the measured information exceeds the predetermined threshold value.

7. The battery pack of claim 1, wherein each of the plurality of battery modules comprises a plurality of battery cells coupled in series.

8. The battery pack of claim 1, wherein the first to third switch units are power relay.

9. The battery pack of claim 1, wherein the current blocking element is a fuse.

10. The battery pack of claim 1, wherein the battery module array further comprises a manual service disconnector module coupled to the plurality of battery modules.

* * * * *